May 5, 1953 J. TROENDLE 2,637,338
SHUTOFF VALVE
Filed Aug. 25, 1947
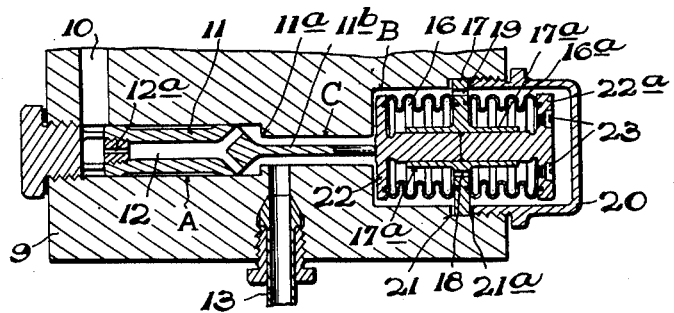
Fig.1.
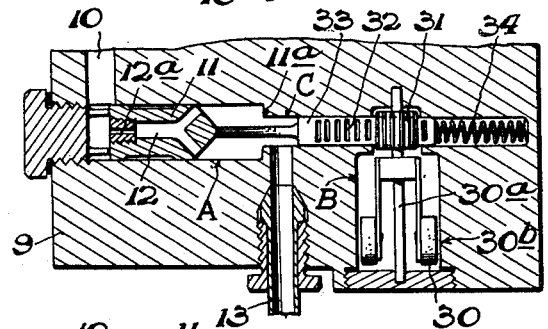
Fig.2.
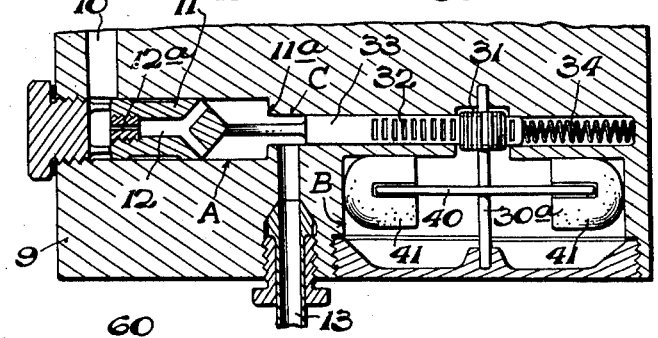
Fig.3.
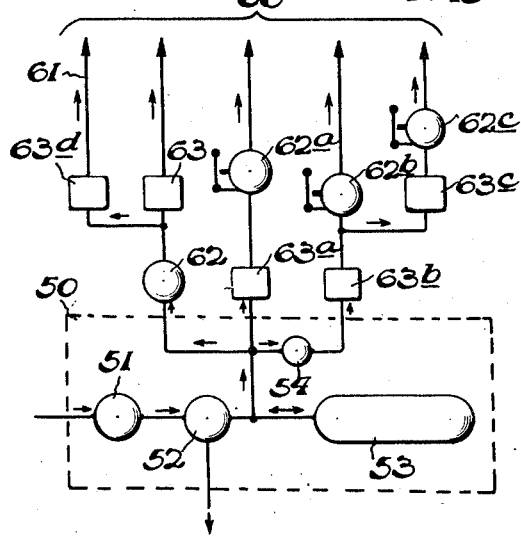
Fig.4.
INVENTOR
Jean Troendle.
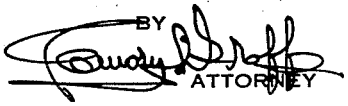
ATTORNEY Patented May 5, 1953

2,637,338

UNITED STATES PATENT OFFICE 2,637,338

SHUTOFF VALVE

Jean Troendle, Geneva, Switzerland

Application August 25, 1947, Serial No. 770,400
In Switzerland May 2, 1947

5 Claims. (Cl. 137—498)

The present invention relates to means which automatically comes into service to prevent the complete impairment of the operation of fluid control systems.

More specifically, the invention relates to a pneumatic installation comprising one or more sources of compressed air, one or more compressed air reservoirs, a plurality of devices to be supplied with compressed air and conduits connecting the elements just described. Such an installation may be used to advantage on aircraft, for the remote control or actuation of various devices.

In a pneumatic system of the type described, the accidental breakage or failure of one of the devices to be supplied with compressed air, or of a line connecting same to the rest of the system has for its consequence that air will escape from the whole installation through the defective member, and, after a period of time, depending on the seriousness of the failure, the air pressure in the whole system will have dropped to a point where no control can be further obtained by means of the system. This inconvenience may be avoided by the use of a shut-off valve located in the conduit connecting any one single device to be supplied with compressed air to the remainder of the installation and which automatically closes said conduit when the air pressure drop is in excess of a predetermined critical value or when it lasts more than a predetermined critical time. This time interval is necessary in order to differentiate between a normal pressure drop in the line taking place each time a normal demand for compressed air exists from the part of the device to be supplied, and an abnormal and continuous demand due to a failure of the type assumed.

The object of the present invention is to provide an automatic shut-off valve device for pneumatic control systems wherein the valve in the conduit connecting the system with the apparatus to be actuated is slowly closed under the retarding action of a damping agent acting in a damping means responsive to a drop in pressure on the downstream side of the valve seat in accordance with predetermined pressure differential existing by reason of the predetermined characteristics of the damping agent. In that connection, the damping means of the present invention may be made in different forms of embodiment. In one form the damping agent is a liquid set in motion to produce liquid frictional forces in a hydraulic damping means of the liquid filled bellows type; in another form the damping agent is a set of centrifugal weights producing mechanical frictional forces in a damping means of the mechanical type while in a third form the damping agent is an electric conductor caused to move in a magnetic field thus producing a magnetic damping force in a damping means of the electromagnetic type.

The accompanying drawing represents diagrammatically, and by way of example, three different forms of embodiment, and a diagram of a typical installation.

Figure 1 is a longitudinal section of a shut-off valve provided with a hydraulic time delaying device.

Figure 2 is a longitudinal section of a shut-off valve similar to that of Figure 1 with the difference that it is equipped with a mechanical time delaying device.

Figure 3 is a longitudinal section of a shut-off valve similar to that of Figure 1 with the difference that it is equipped with an electromagnetic time delaying device.

Figure 4 is a diagram of a typical pneumatic control system.

Similar reference characters designate similar parts in all forms of embodiment.

As will be observed from the drawing, all forms of the invention include a valve housing 9 having a valve chamber A, and a damper chamber B connected by a relatively narrow guide passage C. The valve chamber A forms part of a main compressed air conduit, including the inlet 10, the guide passage C and the outlet connection 13.

The valve chamber A contains a valve 11 adapted to move relative to a valve seat 11a and including an item 11b of reduced cross-section, and having a central passage 12 whose upstream end is fitted with a plug having a calibrated orifice 12a, while its downstream end may be provided with the forked outlet portions so that the extreme inner end of the valve may have an extension as shown in Figure 1, or may be engaged by an equivalent extension on the damper means. Under normal operating conditions, the valve 11 is open, that is, unseated, and is maintained in this condition by one of the damping devices shown in Figure 1, 2 or 3.

Accordingly, it will be understood that in all forms of the invention, compressed air passing through the inlet conduit 10 and discharging through the outlet 13 will traverse the valve chamber A, including the hollow stem of the valve 11 through the calibrated opening 12a.

In Figures 1, 2 and 3 the valve 11 is shown in its position of rest, and will move toward its seat 11a upon the occurrence of a pressure differential existing between the inlet and outlet means 10 and 13, said pressure drop resulting from the throttling effect of the orifice 12a. The displacement of the valve 11 from its normal open position causes an equal displacement of the damping device.

Referring now to the form of damping device shown in Figure 1, it will be observed that the same includes a pair of spring bellows sections 16 and 16a, each of which have their inner ends in sealed connection with the central flange 17 of a tubular guide member 17a. The central flange 17 is provided with a calibrated liquid orifice 18 within the bellows sections 16 and 16a, and is also provided with an air opening 19 outside said sections 16 and 16a.

As will be seen from Figure 1, the central flange 17 is clamped in a recess of the housing 9 by a cap 20, sealing means 21 and 21a being provided to position the flange 17 in the housing in an airtight manner. The tubular guide member 17a receives the stem portions of a pair of plungers which include the opposite end walls or heads 22 and 22a, the latter having filler plugs 23 for permitting the insertion of a liquid into the bellows section 16 and 16a. In the arrangement shown, it will be seen that the head 22 of one of the plungers is in contact with the portion of the valve 11 which extends into the passage C. The purpose of the calibrated orifice 18 is to delay movement of the ends 22 and 22a of the plungers. That is to say that when valve 11 tends to move to the right under the action of the air pressure drop across orifice 12a, it can not do so freely owing to the resistance offered by the fluid contained in bellows section 16, and which must be forced through orifice 18 in order to pass into bellows section 16a.

As a result of the throttling action of the liquid through the calibrated orifice 18, the movement of the valve 11 is damped to an extent which may be varied within wide limits by the proper choice of the calibrated orifices 12a and 18, as well as the diameter of the bellows sections 16 and 16a.

In practice, the different elements of the installation to be supplied with compressed air may have different characteristics, depending on the type of service required. Therefore, it is convenient to be able to regulate the closing time of the valve 11 by selecting orifices 12a and 18 of proper diameter, leaving the other elements of the time delaying device unchanged. In any case, whenever the supply of air to the apparatus to be actuated takes place rapidly, the valve 11 will not have time to move to its seat. On the contrary, if the operation of the air actuated apparatus requires a longer period of time, there will be a definite air flow during all this period. The calibrated orifice 12a may thus be chosen so that the air pressure drop across the valve 11 will cause only a slight movement of said valve, this movement stopping when the yielding force opposed by the bellows sections 16 and 16a equals the force exerted by valve 11 on the wall 22 of the plunger.

In Figure 2 the time delaying device comprises a mechanical damper or brake of the governor type. This arrangement includes a rod 33 carrying a rack 32 meshing with a pinion 31 mounted on shaft 30a, having spring arms depending from a collar and carrying weights 30. During its movement, the valve 11 pushes rod 33 and the rack and pinion means 31—32 rotates the weights 30, which, under the action of the developed centrifugal force exert a mechanical braking action on the walls of chamber 30b, checking the velocity of valve 11. A spring 34 pushes gear rack 33 toward the left and maintains same in contact with valve 11. The magnitude of this braking effect may be obtained at will by the proper choice of calibrated orifice 12a and magnitude of weights 30.

Figure 3 shows a shut-off valve similar to that of Figure 2 with the difference that damping of the closing movement of valve 11 is obtained by the medium of the electro-magnetic reaction of a metallic disc 40 driven in rotation by rod 33, gear rack 32 and pinion 31, in the magnetic field of permanent magnets 41.

Figure 4 is a diagram showing the application of shut-off valves according to the invention, applied to a typical pneumatic control system. The dotted rectangle 50 designates the portion of the installation supplying the whole system with compressed air, and comprises an air compressor 51, a pressure regulator 52, a reservoir 53 and a pressure reducer 54. This portion 50 of the installation supplies the air-actuated, or air-consuming apparatus designated collectively by 60 and not shown on the drawing, by means of conduits 61, each of which are equipped with a control valve 62, 62a, 62b, 62c and with automatic time delaying shut-off valves 63, 63a, 63b, 63c, and 63d.

In laying out an actual installation, it is clear that each shut-off valve shall be placed at the most advantageous point of the conduit which it is intended to close. In fact, in order to minimize the risks of leakage, effort shall be made to group in one single unit at least the pressure regulator, the pressure reducer and the shut-off valves in order to avoid numerous connecting pipes, couplings and fittings. Whenever advisable, control valves shall be also mounted in this unit.

In a pneumatic installation, comprising a plurality of air-actuated, or air-controlled devices, the advantage afforded by the use of shut-off valves of the type described, is that after one or more air consuming devices have been damaged or ruptured, said installation will continue to control the undamaged devices.

I claim:

1. An automatic shut-off valve for pneumatic control systems, including, a valve housing having a valve chamber provided with a valve seat and a damper chamber in communication with the valve chamber by a guide passage, a compressed air inlet at the end of the valve chamber opposite said valve seat, a compressed air outlet communicating with said guide passage downstream of said valve seat, a valve in said valve chamber and having a hollow stem, a plug having a calibrated orifice at the inlet end of said hollow stem of the valve, said plug end of the valve being exposed to air pressure from the said compressed air inlet, and damper means in said damper chamber connected to said valve and operable independently of the air in the pneumatic system and for damping the motion of said valve, said damper means including, spring means normally exerting a force of sufficient magnitude on said valve to maintain the same unseated while the air pressure drop across the valve is below a predetermined value, and whereby, when the pressure on the downstream side of the valve drops abruptly, said damper means will permit the valve to seat after a predetermined period of time.

2. An automatic shut-off valve for pneumatic control systems comprising a housing having a valve chamber provided at one end with a valve seat and having a damper chamber communicating by a guide passage with the valve chamber, an air inlet at the other end of the valve chamber, an air outlet communicating with the guide passage downstream of said valve seat, a valve member slidable in the valve chamber and operable by a predetermined pressure in the outlet lower than that in the inlet and constituting a hollow stem including two diverging channels communicating at the downstream end of the member with the valve chamber, a plug having a calibrated orifice at the upstream end of the valve member and exposed to air pressure from the inlet, and damping means in the damper chamber connected to the valve member.

3. An automatic shut-off valve for pneumatic control systems, including, a valve housing having a valve chamber provided with a valve seat and a damper chamber in communication with the valve chamber by a guide passage, a compressed air inlet at the end of the valve chamber opposite said valve seat, a compressed air outlet communicating with said guide passage downstream of said valve seat, a valve in said valve chamber having a hollow stem, a plug having a calibrated orifice at the inlet end of said hollow stem of the valve, said plug end of the valve being exposed to air pressure from the said compressed air inlet, and damper means in said damper chamber for damping the motion of said valve, said damper means including, a tubular guide member having a central flange seated in a recess of the valve housing, a hollow cap for clamping said flange in the recess, a pair of plungers having their stem portions fitted in said tubular guide member, and having their heads disposed at opposite sides of the said central flange and in spaced relation thereto, bellows sections having their opposite end portions respectively in sealed connection with the opposite faces of the central flange, and the inwardly facing walls of the plunger heads, a fluid within the opposite bellows sections, said central flange of the guide member having a port outside of the bellows sections for establishing air communication with opposite sides of the central flange and also having a port within the bellows sections for permitting the movement of fluid from one bellows section to another; one of said plungers engaging the valve normally to hold the same unseated, while air pressure drop from the inlet passage to the outlet passage is below a predetermined value, and, whereby, when an abrupt drop in pressure occurs downstream of the valve seat, the plunger which is in contact with the valve will move inwardly and permit the valve to move to its seat and reach said seat only after a predetermined period of time.

4. An automatic shut-off valve for pneumatic control systems, including, a valve housing having a valve chamber provided with a valve seat and a damper chamber in communication with the valve chamber by a guide passage, a compressed air inlet at the end of the valve chamber opposite said valve seat, a compressed air outlet communicating with said guide passage downstream of said valve seat, a valve in said valve chamber having a hollow stem, a plug having a calibrated orifice at the inlet end of said hollow stem of the valve, said plug end of the valve being exposed to air pressure from the said compressed air inlet, and damper means in said damper chamber abutting the free end of said valve, said damper means including, a gear rack movable in said guide passage of the housing, a spring for urging said rod in a direction to engage the valve member to maintain said valve unseated while air pressure drop across the valve is below a predetermined value, a shaft at right angles to said rack and extending into said damper chamber, a pinion on said shaft meshing with said rack, and a plurality of weights spring-connected to said shaft whereby when the air pressure drop across the valve is above the predetermined value, such as may be caused by a pressure drop on the downstream side of the valve seat, said spring is compressed and the rack moves to rotate said shaft and cause said weights to move by centrifugal force to frictionally engage the walls of said damper chamber.

5. An automatic shut-off valve for pneumatic control systems, including, a valve housing having a valve chamber provided with a valve seat and a damper chamber in communication with the valve chamber by a guide passage, a compressed air inlet at the end of the valve chamber opposite said valve seat, a compressed air outlet communicating with said guide passage downstream of said valve seat, a valve in said valve chamber having a hollow stem, a plug having a calibrated orifice at the inlet end of said hollow stem of the valve, said plug end of the valve being exposed to air pressure from the said compressed air inlet, and damper means in said damper chamber abutting the free end of said valve, said damper means including, a gear rack movable in said guide passage of the housing, a spring for urging said rod in a direction to engage the valve to maintain the valve unseated while the air pressure drop across the valve is below a predetermined value such as may be caused by a pressure drop on the downstream side of the valve seat, a shaft at right angles to said rack and extending into said chamber, a pinion on said shaft meshing with said rack, a metal disc carried by the shaft, a plurality of permanent magnets arranged in said damper chamber and embracing the periphery of said disc, whereby, when pressure drops on the downstream side of the valve seat and the rack rotates the pinion and disc, the latter will be opposed by a damping force owing to the eddy currents developed in said disc by rotation in the field of said magnets, thereby to permit the valve to seat gradually.

JEAN TROENDLE.

References Cited in the file of this patent

UNITED STATES PATENTS

| Number | Name | Date |
|---|---|---|
| 1,172,818 | Marcuse | Feb. 22, 1916 |
| 1,649,735 | Roschanek | Nov. 15, 1927 |
| 1,821,988 | Rowles | Sept. 8, 1931 |
| 2,138,719 | Wright | Nov. 29, 1938 |
| 2,179,144 | Buttner | Nov. 7, 1939 |
| 2,354,161 | Waterman | July 18, 1944 |
| 2,376,383 | Richards | May 22, 1945 |
| 2,411,392 | Saville | Nov. 19, 1946 |
| 2,518,988 | Hartley | Aug. 15, 1950 |